Sept. 2, 1930.  R. HENIN  1,774,831
PLANETARY TRANSMISSION MECHANISM
Filed March 14, 1929

Inventor:
René Henin
per: J. Severs
Attorney.

Patented Sept. 2, 1930

1,774,831

UNITED STATES PATENT OFFICE

RENÉ HENIN, OF HAINE-ST.-PAUL, BELGIUM

PLANETARY TRANSMISSION MECHANISM

Application filed March 14, 1929. Serial No. 347,108, and in Belgium May 15, 1928.

The present invention relates to a differential planetary transmission mechanism, which is to be applied, for instance, to travelling cranes and similar devices, and more particularly to the transmission mechanisms of the kind having a first planetary pinion or pinions meshing with a sun pinion driven by the driving shaft and with a first rotatable, circular, internally toothed crown, driven by driving means independent of the said driving shaft, and a second planetary pinion or pinions, integral with or rigidly secured to the first planetary pinion or pinions and meshing with a second rotatable, circular, toothed crown adapted to transmit its rotary movement to the driven shaft. Such differential transmission mechanisms thus comprise two separate motors and they allow of increasing ad infinitum the ratio of the speed of the driving shaft to the speed of the driven shaft, the variation being obtained by modifying the relation between the diameters of the planetary pinion or pinions of the first set and the planetary pinion or pinions of the second set; the ratio will be infinite, i. e. the driving shaft will not transmit any movement to the driven shaft, when the planetary pinions of both sets have the same diameter.

Such differential planetary transmission mechanisms are thus of the greatest use in travelling cranes or similar devices, which have to work with various loads, often comprised between two very wide apart limits. Not only do such mechanisms enable travelling cranes to have a very great range of speeds, but they allow of controlling working of the cranes with the greatest possible accuracy and efficiency.

The object of the invention is to construct such differential mechanisms, so as to make them as strong and reliable as possible and capable of resisting any strain or efforts, whether applied gently or suddenly, and this without diminishing their efficiency or reducing their range of speeds. Besides being stronger and more resistant, differential mechanisms according to the invention are also more compact and take up less room than differential mechanisms of known type.

An embodiment of the invention will be described hereafter, merely by way of example, in order that the invention may be clearly understood, and reference will be had to the accompanying drawing, in which.

Figure 1:
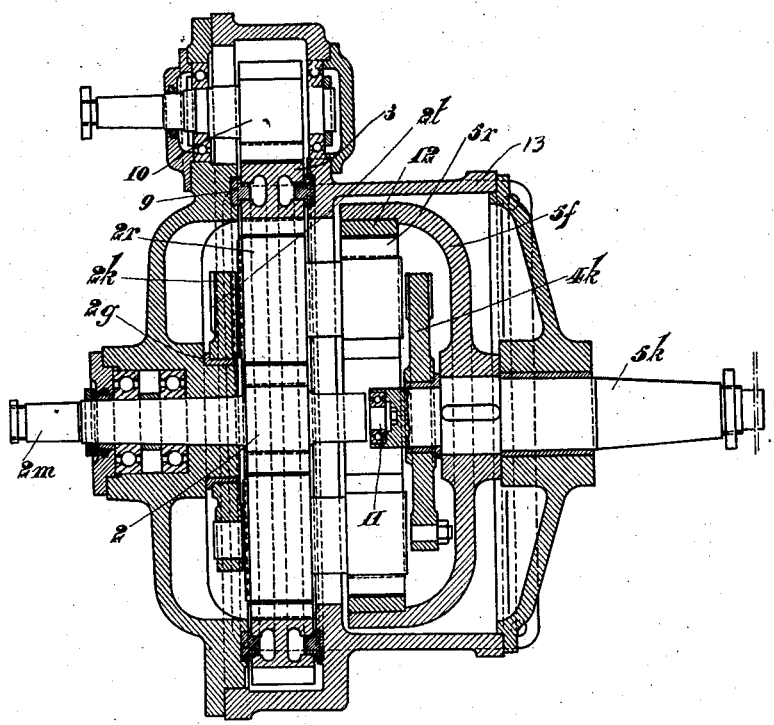
Fig. 1 is a sectional elevation view of a form of construction of the invention.

With reference to Fig. 1, the shaft $2^m$, driven by an electric motor, transmits its movement to a central or sun-pinion 2, meshing with a number of idlers or intermediate or planetary pinions $2^r$, the axis $2^t$ of which is supported on one of its ends by a disc $2^k$, which may be either loosely mounted on the shaft $2^m$ or be loosely mounted, with the interposition of an anti-friction bearing $2^g$, on a sleeve loose upon the shaft $2^m$, as shown in the example illustrated in Fig. 1, or further mounted in any other way. The intermediate pinions $2^r$ mesh with an internally toothed rotatable crown or outer element 3, supported by a suitable anti-friction bearing, such as, for instance, two amply lubricated bronze rings 9, fitting in grooves of the crown 3 and secured to the casing 13 of the mechanism. The crown is also toothed externally and meshes with a spur gear 10, mounted on a shaft 14 parallel to the shaft $2^m$ and driven by a second motor. In the second planetary or hypocyclic train, the sun or central pinion will be normally left out and the movement of the intermediate element $2^r$ of the first train will be directly transmitted to the intermediate element or pinion $5^r$ of the second train, which pinion $5^r$ will be integral with or rigidly secured to the pinion $2^r$, and may even be cast in one piece therewith. In the example illustrated in the drawing, the axis $2^t$ will be common to both pinions $2^r$ and $5^r$ and will be supported at its end remote from the disc $2^k$ by a disc $4^k$, loosely mounted on the driven shaft $5^k$. The intermediate pinion $5^r$ meshes with an internally toothed crown or outer element 12, which is integral with or rigidly secured to the flanged disc $5^f$. The flanged disc $5^f$ is made integral with the driven shaft $5^k$ by any suitable means, such as, for instance, by a key, in such a way that the disc $5^t$ transmits to the driven shaft the movement which it receives from the intermediate pinion $5^r$.

The ratio between the speed transmitted by the shaft $2^m$ and the speed received by the shaft $5^k$, assuming the toothed crown 3 to be stationary, is a function of the ratio of the respective diameters of crowns 3 and 12, or more accurately, of the ratio between the respective ratios of the peripheral rotation speeds of the intermediate pinions of each train about their axis, to the circulation speeds of the contact points between the intermediate pinions and the toothed crowns about the axis of the planetary gear sets, so that, if the diameters of the crowns and, therefore, the diameters of the intermediate pinions are equal, the driven shaft $5^k$ will not receive any movement from the driving shaft $2^m$.

Figure 2:
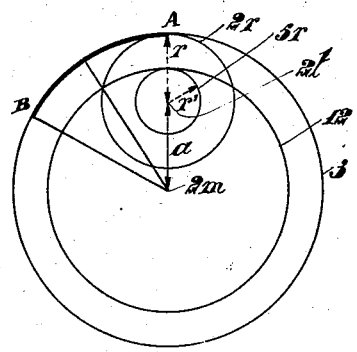
Fig. 2 is a front view, showing in a diagrammatic way two planetary gears of the device according to Fig. 1 and their real and relative displacements.

Fig. 2 illustrates a diagrammatic front view of two intermediate pinions and shows the path of these, and also how the movement of the intermediate pinion $2^r$ is transmitted to the toothed crown 12.

In this drawing, $a$ designates the distance between the axis $2^m$ and the axis $2^t$ of the intermediate pinions; $r$ designates the radius of pinion $2^r$, and $r'$ the radius of pinion $5^r$.

Assuming the crown 3 to be stationary and considering a displacement of the intermediate pinion $2^r$ such that this pinion has rotated about its own axis of an angle $\omega$, the contact point between said intermediate pinion and the toothed crown 3 will have described an arc A—B and the intermediate pinion will have rotated about the axis $2^m$ of an angle $$\alpha = \omega \left( \frac{r}{a+r} \right).$$

The intermediate pinion $5^r$, which moves integrally with the pinion $2^r$, will thus have rotated about its own axis during this time of an equal angle $\omega$ and will have rotated about the axis $2^m$ of an equal angle $\alpha$.

The relative angular displacement, however, of the intermediate pinion $5^r$ to the toothed crown 12 will have been of an angle $\alpha' = \omega \left( \frac{r'}{r'+a} \right)$; the result of this is that the angular displacement of the crown 12 will have been of an angle $\alpha'' = \alpha - \alpha' = \omega \left( \frac{r}{r+a} - \frac{r'}{r'+a} \right)$; the result of this is that, according to $r$ being greater, smaller or equal to $r'$, $\alpha$ will also be greater, smaller or equal to $\alpha'$, and the crown 12 will rotate in the same direction as the shaft $2^m$ or in the opposite direction, or will not rotate at all.

Now, when a rotary movement about its axis is imparted to the toothed crown 3, this movement multiplied by an appropriate coefficient of reduction, will be superimposed in a positive or negative way to the rotation speed of the crown 12, as the case may be.

It will thus be possible to modify the ratio of the speed transmitted by the driving shaft to the speed received by the driven shaft, either by modifying the ratio of the diameters of the respective toothed crowns, or by modifying the relative speeds of the two electric motors.

In order to equilibrate the forces acting upon the sets, one end of the driven shaft and the adjoining end of the driving shaft are connected by a ball bearing 11, or by an antifriction bearing or any other suitable device.

I claim:

1. A transmission mechanism comprising a driving and a driven shaft, a sun gear mounted to rotate with said driving shaft, a set of planet wheels meshing with said sun gear, a second set of planet gears adapted to move integrally with the planet wheels of the first set, an inwardly toothed crown meshing with the planet wheels of the second set, means to transmit the movement of this crown to the driven shaft, an outwardly and inwardly toothed crown meshing with the planet wheels of the first set, the inner and outer toothed surfaces of said crown being opposite to one another, a spur gear meshing with the outer toothed surface of the crown in mesh with the planet wheels of the first set, grooves in said last-mentioned crown, bearings accommodated in said grooves and consisting of two stationary rings of white metal.

2. A transmission mechanism comprising a driving and a driven shaft, a sun gear mounted to rotate wih said driving shaft, a set of planet wheels meshing with said sun gear, a second set of planet wheels adapted to move integrally with the planet wheels of the first set, an inwardly toothed crown meshing with the planet wheels of the second set, means to transmit the rotary movement of this crown to the driven shaft, an outwardly and inwardly toothed crown meshing with the planet wheels of the first set, the inner and outer toothed surfaces of this crown being opposite one another, a spur gear meshing with the outer toothed surface of the crown in mesh with the planet wheels of the first set, grooves formed in said last-mentioned crown, bearings accommodated in said grooves and consisting of stationary rings having a T-shaped cross section made of white metal and fixed to the casing of the mechanism.

3. A transmission mechanism comprising coaxial driving and driven shafts, a sun gear on the driving shaft, a set of planet gears meshing with said sun gear, a second set of planet gears, both sets being supported by a unitary carrier, an orbit gear meshing with the second set of planet gears and adapted to drive the driven shaft, a second orbit gear meshing with the first set of planet gears and having internal and external teeth, a spur gear meshing with the external teeth of said second orbit gear, a casing for housing all said elements except the spur gear, said casing comprising a cylindrical body and caps forming bearings for the driving and driven shafts respectively, the cylindrical body and the driving shaft side cap providing juxtaposed circular seatings for the orbit gear having internal and external teeth and juxtaposed cylindrical extensions for housing the spur gear.

In testimony whereof I signed hereunto.

RENÉ HENIN.